United States Patent
Smith et al.

(10) Patent No.: US 7,649,469 B2
(45) Date of Patent: Jan. 19, 2010

(54) PRESSURE SENSITIVE WORK INDICATOR

(75) Inventors: Eric M. Smith, Wildwood, MO (US); Joseph C. Marsh, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 11/755,615

(22) Filed: May 30, 2007

(65) Prior Publication Data
US 2008/0297343 A1 Dec. 4, 2008

(51) Int. Cl.
G08B 21/00 (2006.01)
(52) U.S. Cl. .......................... 340/665; 73/762
(58) Field of Classification Search .............. 340/665; 73/761, 762; 411/13
See application file for complete search history.

(56) References Cited

U.S. PATENT DOCUMENTS

| 5,280,967 | A | 1/1994 | Varrin, Jr. |
| 5,612,492 | A * | 3/1997 | Schwab et al. ............ 73/705 |
| 6,425,718 | B1 | 7/2002 | Herr et al. |
| 6,609,865 | B2 * | 8/2003 | Daigneault ............... 411/13 |
| 2002/0023504 | A1 | 2/2002 | Austin |

2004/0200290 A1 10/2004 Almanstoetter et al.

FOREIGN PATENT DOCUMENTS

GB 2194062 2/1988

OTHER PUBLICATIONS

Jackson, "Fundamentals, Pressure Sensitive Paint", found at http://www.aerospaceweb.org/design/psp/fundamentals.shtml, bases on paper originally written by Doug Jackson, Fall 1999, 2 pages.
NRC Aerospace, "Pressure Sensitive Film", found at http:/iar-ira.nrc-cnrc.gc.ca/smpl/smpl_3b_e.html, National Research Council Canada, modified Dec. 15, 2006, 3 pages.
PCT Intl Search Report and Written Opinion for Application No. PCT/US2008/064148, dated Oct. 6, 2008, 11 pgs.

* cited by examiner

*Primary Examiner*—John A Tweel, Jr.
(74) *Attorney, Agent, or Firm*—Lee & Hayes, PLLC

(57) ABSTRACT

Systems and methods for indicating applied manipulation pressure are disclosed. In one embodiment, a method for indicating applied manipulation pressure includes affixing a pressure sensitive material to a coupling component. The pressure sensitive material is capable of displaying visual indications that correspond to different levels of applied manipulation force. A manipulation force is applied to the component. Subsequently, the pressure sensitive material displays the visual indications. In a specific implementation, the method also includes stopping the application of manipulation force when one of the visual indications is displayed.

20 Claims, 5 Drawing Sheets

PRESSURE SENSITIVE WORK INDICATOR

FIELD OF THE INVENTION

This invention relates to systems and methods for force measurement, and more specifically, to systems and methods for indicating proper application of manipulation force on a hardware component.

BACKGROUND OF THE INVENTION

A vehicle, such as an aircraft, may have many hydraulic connections that are located within confined spaces. For example, hydraulic connections are typically present in aircraft wheel wells. Generally, it is important to complete all hydraulic connections prior to running pressure checks on an aircraft's hydraulic system. Workers typically rely on memory and visual inspections to ensure that hydraulic system connections are properly made.

However, in some instances, faulty memory, discomfort associated with working in confined spaces, as well as interruptions and distractions, may cause workers to fail or improperly tighten (i.e., under-tighten or over-tighten) connections in an aircraft's hydraulic system during assembly or maintenance. Moreover, visual inspections of the hydraulic connections may not always identify connections that are not tightened to the correct torque. Therefore, novel systems and methods which reduce or eliminate instances of failure to tighten or improperly tightened hydraulic connections would have utility.

SUMMARY OF THE INVENTION

Systems and methods for providing visual indications of properly tightened components are disclosed. Embodiments of systems and methods in accordance with the present disclosure may advantageously reduce or eliminate incidents of failure to tighten or improper tightening of components. Such components may include hydraulic connections present in aircraft hydraulic systems.

In one embodiment, a method for indicating applied manipulation pressure to a component includes affixing a pressure sensitive material to a coupling component. The pressure sensitive material is capable of displaying visual indications that correspond to different levels of applied manipulation force. A manipulation force is applied to the coupling component. Subsequently, the pressure sensitive material displays visual indications that correspond to different levels of applied manipulation force. In a specific implementation, the method also includes stopping the application of manipulation force when the visual indications are displayed.

In another embodiment, a method for indicating applied pressure for a coupling component includes selecting a pressure sensitive material for the coupling component. Generally speaking, the selected pressure sensitive material will display a color of a first intensity when the coupling component receives a desired torque pressure, and display the same color in a second intensity when the torque pressure is excessive. Following the selection of the pressure sensitive material, the material is affixed to the coupling component. A torque pressure is then applied to the coupling component so that the first intensity is displayed when the applied pressure reaches the desired torque intensity. Moreover, the second intensity may be displayed when the applied torque pressure is excessive.

In an additional embodiment, a system for indicating applied manipulation pressure is disclosed. The system includes a coupling component configured to fluidly couple a first coupling component to a second coupling component, and a pressure indication layer. The pressure indication layer is applied to an outer surface of the coupling component and configured to display at least one visual indication that corresponds to at least one threshold of a manipulation force.

The features, functions, and advantages that have been above or will be discussed below can be achieved independently in various embodiments, or may be combined in yet other embodiments, further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

Embodiments of systems and methods in accordance with the present disclosure are directed to providing visual indications of properly tightened components. Many specific details of certain embodiments of the invention are set forth in the following description and in FIGS. 1-5 to provide a thorough understanding of such embodiments. The present invention may have additional embodiments, or may be practiced without one or more of the details described below.

Generally, embodiments of systems and methods in accordance with the present disclosure provide visual indicators that signal the amount of manipulation force applied to a component. Thus, these embodiments may advantageously reduce or eliminate incidents of failure to tighten or improper tightening of components.

Figure 1A:
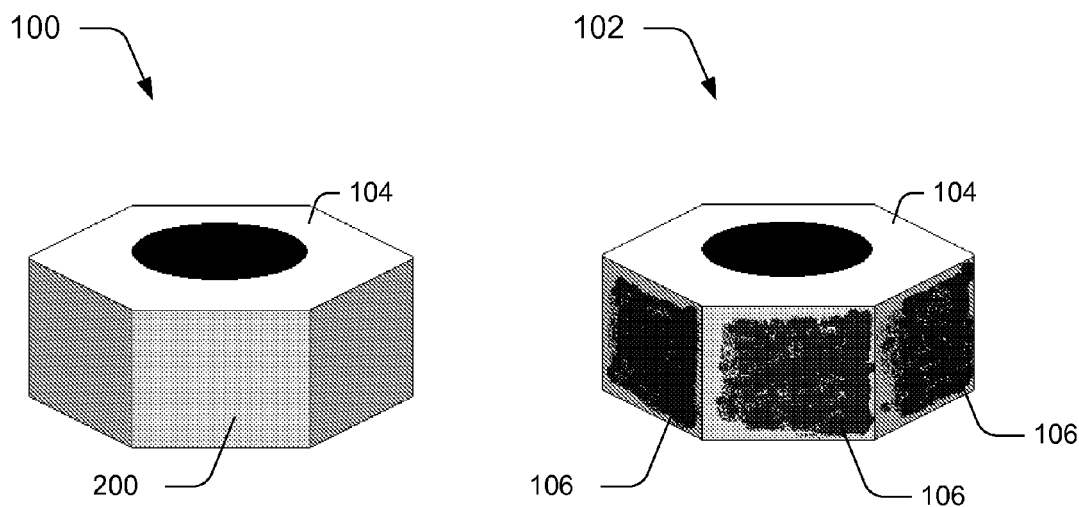
FIGS. 1a and 1b are isometric views illustrating exemplary fasteners that include pressure sensitive materials in accordance with an embodiment.
Figure 1B:
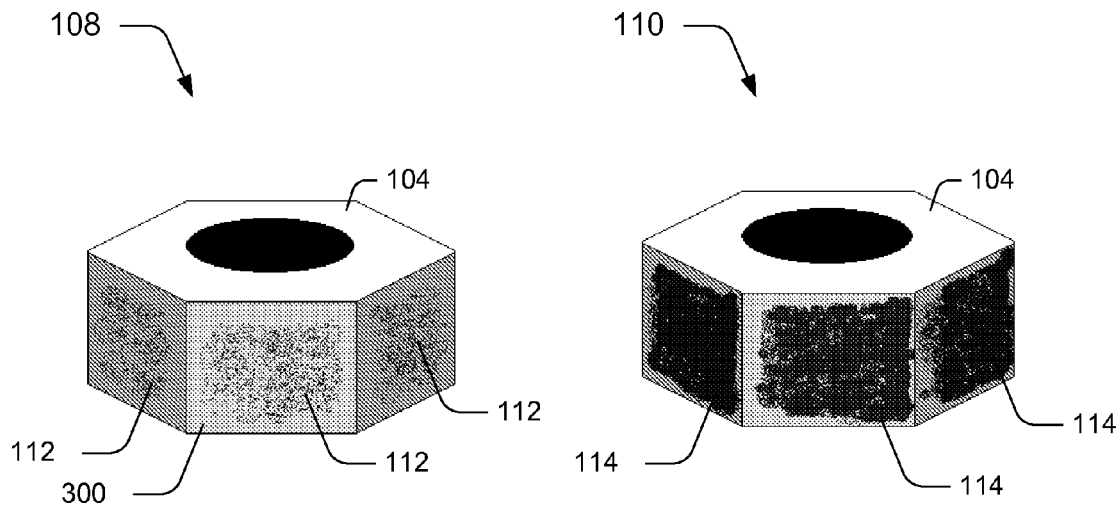

FIGS. 1a and 1b are isometric views 100, 102 illustrating exemplary fasteners that include pressure sensitive work indicator materials in accordance with embodiments of the invention. Specifically, isometric view 100 depicts an exemplary fastener 104 that includes a pressure sensitive film 200 (as described in FIG. 2). In one implementation, the pressure sensitive film 200 may be affixed around the circumference (tool contact surfaces) of the fastener 104 by an adhesive. In another implementation, the pressure sensitive film 200 may be affixed by "shrink wrapping" the pressure sensitive film 200 around the circumference of the fastener 104, so that the pressure sensitive film 200 is held in place by frictional tension. However, it will be appreciated that other joining techniques may be used to affix the pressure sensitive film 200 to the fastener 104, e.g., mechanical joining using staples, rivets, etc.

Figure 2:
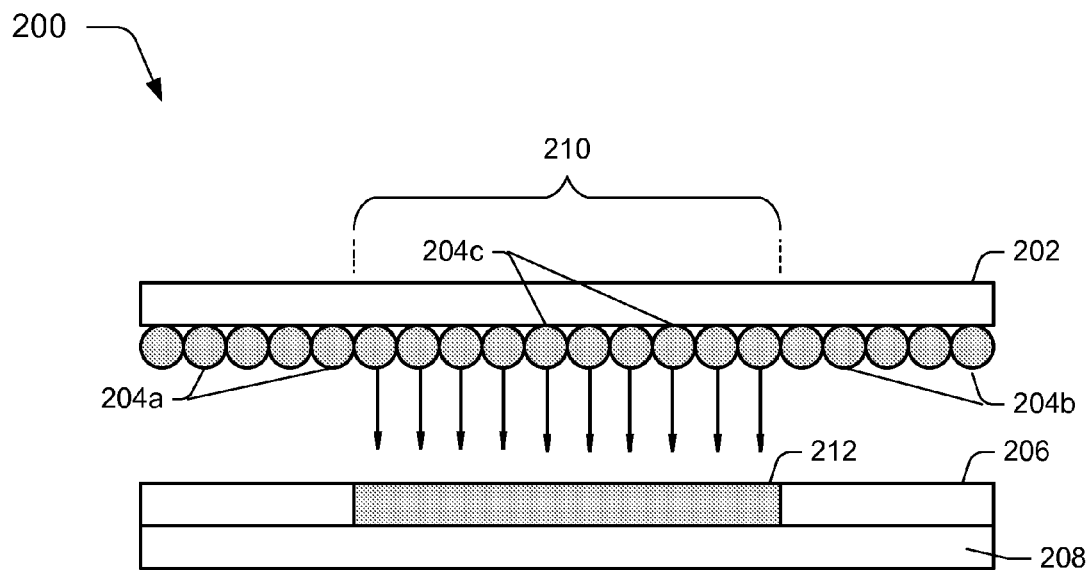
FIG. 2 is an enlarged side view of an exemplary pressure sensitive film.

FIG. 2 is an enlarged, partially-exploded side view of an exemplary pressure sensitive film 200 of FIG. 1a. The exemplary pressure sensitive film 200 includes an upper base layer 202, one or more microcapsules 204, a color developing layer 206, and a lower base layer 208. In one implementation, the upper base layer 202 and the lower base layer 208 may include a polyester material.

As shown in FIG. 2, manipulation pressure may be applied to region 210 of the upper base layer 202. The downward pressure may cause the microcapsules 204 in region 210 to burst. The bursting microcapsules 204 may release a material that reacts with portion 212 of the color developing layer 206. The resulting reaction may cause portion 212 of the color developing layer 206 to display a color, e.g., red, blue, green, and the like.

The microcapsules 104 may be configured to burst under predetermined pressure levels. In one example, the microcapsules 104 may be configured to burst at a pressure range of 0.5 millipascal (MPa). In another example, the microcapsules 104 may be configured to burst at a pressure of 10 MPa. In additional examples, the pressure sensitive film 200 may include microcapsules 104 that are configured to burst to various degrees of pressure.

Specifically, with reference to FIG. 2, first microcapsules 204a may be configured to burst at a first pressure, second microcapsules 204b may be configured to burst at a second pressure, and third microcapsules 204c may be configured to burst at a third pressure. Such pressure sensitive films may also show a range of color intensity that corresponds to specific levels of applied pressure. The intensity of the color may be evaluated according to a pre-established chart to determine the applied pressure. In some embodiments, the various microcapsules 204a, 204b, 204c may not only burst at different applied pressures, but may also provide different intensities of the same color, or even different colors.

Referring again to FIG. 1a, isometric view 102 depicts the exemplary fastener 104 after pressure has been applied to the pressure sensitive film 200. The applied pressure may be one of an impact pressure, a compression pressure, a torque pressure, etc. Further, the applied pressure may include manipulation force used to tighten the fastener 104 for installation, e.g., torque pressure used to mount the threaded fastener 104 to a corresponding threaded pin. As shown, at least some of the microcapsules 204 have burst under the applied pressure. The reaction of the discharged material from the microcapsules 204 with the color developing layer 206 of the pressure sensitive material 200 may produce the color patches 106. In turn, color patches 106 may indicate that manipulation pressure has been applied to the fastener 104.

Moreover, FIG. 1b shows isometric views 108 and 110. Isometric view 108 depicts the exemplary fastener 104 that includes a pressure sensitive paint 300 (as described in FIG. 3). In one implementation, the pressure sensitive paint 300 may include a binding agent that affixes the pressure sensitive paint 300 to the fastener 104. In particular, the pressure sensitive paint 300 may be affixed around the circumference (tool contact surfaces) of the fastener 104. As illustrated by the colored regions 112 and described below, a light source 306 may be used to cause the pressure sensitive paint 300 to emit radiation 308.

Figure 3:
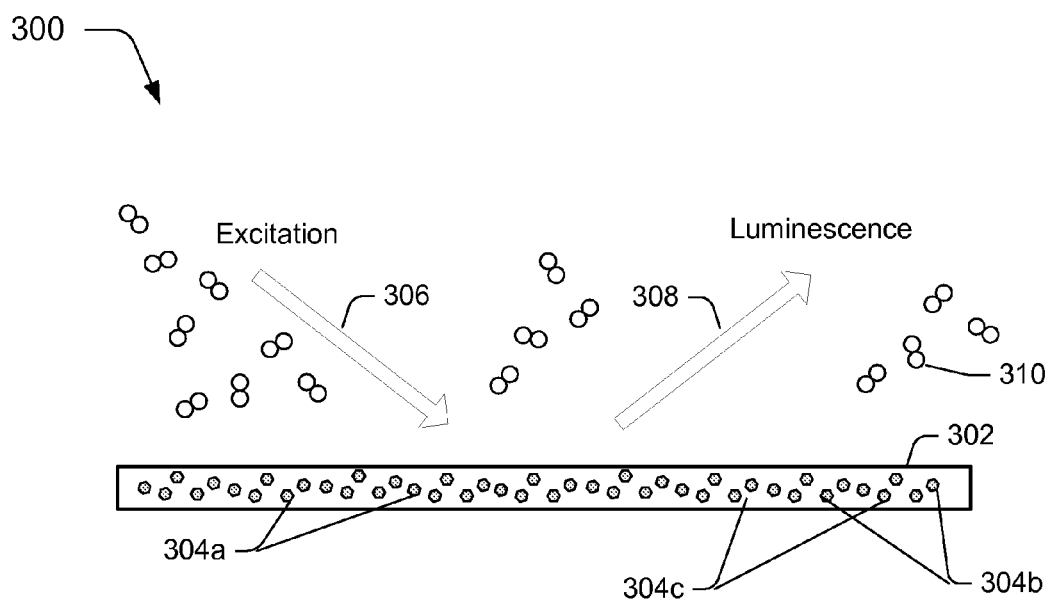
FIG. 3 is an enlarged side view of an exemplary pressure sensitive paint.

FIG. 3 is a side view of an exemplary pressure sensitive paint 300. The exemplary pressure sensitive paint 300 may include an oxygen permeable binder 302. Particles of luminescent dye 304 may be dispersed throughout the oxygen permeable binder 302. The particles of luminescent dye 304 may be excited by a light source 306. In some implementations, the light source 306 may be a blue light source or an ultraviolet (UV) light source. Generally speaking, the excitation of the particles of luminescent dye 304 may cause them to emit radiation 308. In one example, radiation 308 may include visible light in the red portion of the electromagnetic spectrum. Once a particle of the luminescent dye 304 has emitted radiation 308, it may return to a ground state, at which point it may be re-excited by light source 306.

Alternatively, the particles of luminescent dye 304 may interact with oxygen molecules 310. The interaction of the particles of luminescent dye 304 and oxygen molecules 310 may cause the particles of luminescent dye 304 to return to their ground state without emitting radiation 308. This process is commonly known as oxygen quenching.

Accordingly, increased pressure on pressure sensitive paint 300 may cause the quantity of oxygen molecules 310 within the pressure sensitive paint 300 to change. For example, increased air pressure may cause more oxygen molecules 310 to enter the oxygen permeable binder 302. This increased oxygen concentration may cause more oxygen molecules 310 to interact with the particles of luminescent dye 304. As a result, the luminescent dye particles 304 may emit decreased levels of radiation 308. The level of decrease is generally in proportion to the pressure on the pressure sensitive paint 300. On the other hand, increased physical compression pressure may drive out oxygen molecules 310 from the pressure sensitive paint 300. Accordingly, the decreased interaction of oxygen molecules 310 with luminescent dye particles 304 may cause the pressure sensitive paint 300 to increase the level of emitted radiation 308.

In certain examples, the level of increase or decrease may be detected by a computer. Specifically, a filter may be used to filter out all light energy except emitted radiation 308. For example, a red filter may be used to filter out all light energy except visible light in the red portion of the electromagnetic spectrum. Subsequently, a sensor, e.g., a camera, may be employed to monitor the decreasing level of radiation as indicated by the intensity of the emitted radiation 308, so that the decrease of radiation 308 may be analyzed by a computer and correlated with one or more pressure levels.

In some embodiments, the particles of luminescent dye 304 may include first particles 304a that are "quenched" at a first level of applied pressure, second particles 304b that are quenched at a second level of applied pressure, and third particles 304c that are configured to quench at a third level of applied pressure. In some embodiments, the various particles 304a, 304b, 304c may not only variably increase the emission of radiation at different levels of applied physical pressure, but may also emit different intensities of the same color (or wavelength) of radiation 308, or different colors (or wavelengths) of radiation 308.

Returning to FIG. 1b, isometric view 110 depicts the exemplary fastener 104 after pressure has been applied to the pressure sensitive paint 300. The applied pressure may be one of an impact pressure, a compression pressure, a torque pressure, etc. Further, the applied pressure may include manipulation force used to tighten the fastener 104 for installation, e.g., torque pressure used to mount the threaded fastener 104 to a corresponding threaded pin.

The applied pressure may cause decreased interactions between oxygen molecules 310 and the luminescent dye particles 304. Due to this decreased interaction, the pressure sensitive paint 300 may increase the production of emitted radiation 308 in regions 114. Accordingly, regions 114 may indicate that manipulation pressure has been applied to the fastener 104. In various embodiments, regions 114 may be discerned with the human eye or by a sensor-equipped computer.

While FIGS. 1a and 1b illustrate exemplary fastener 104, it will be appreciated that a pressure sensitive material may be applied to any hardware component that is subject to manipulation by a tool. The tool may be a manual device, e.g., a hand operated wrench, or a power-assisted device, e.g., a pneumatically powered wrench. Moreover, the manipulation may occur during assembly or repair of a hardware product that includes the hardware component. For example, the hardware component may be part of an aircraft, an automobile, and another type of vehicle, machinery, appliances, and the like. Additionally, it will be further appreciated that the pressure sensitive material may be applied to any surface of a hardware component. However, in most implementations, the surface treated with the pressure sensitive material is generally subject to direct manipulation by a tool.

Figure 4A:
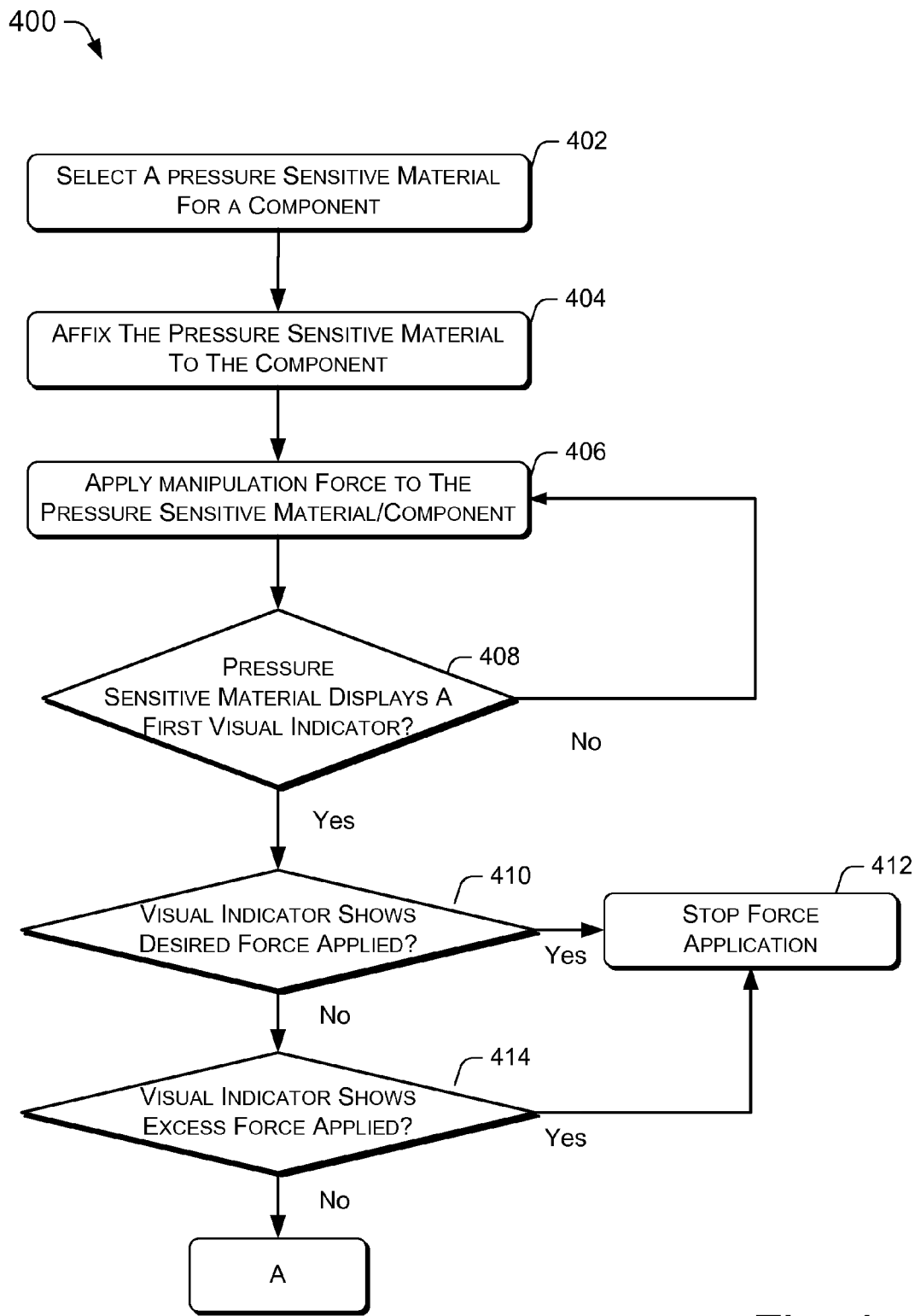
FIG. 4 is a flow diagram illustrating an exemplary process for using pressure sensitive materials in accordance with an embodiment.
Figure 4B:
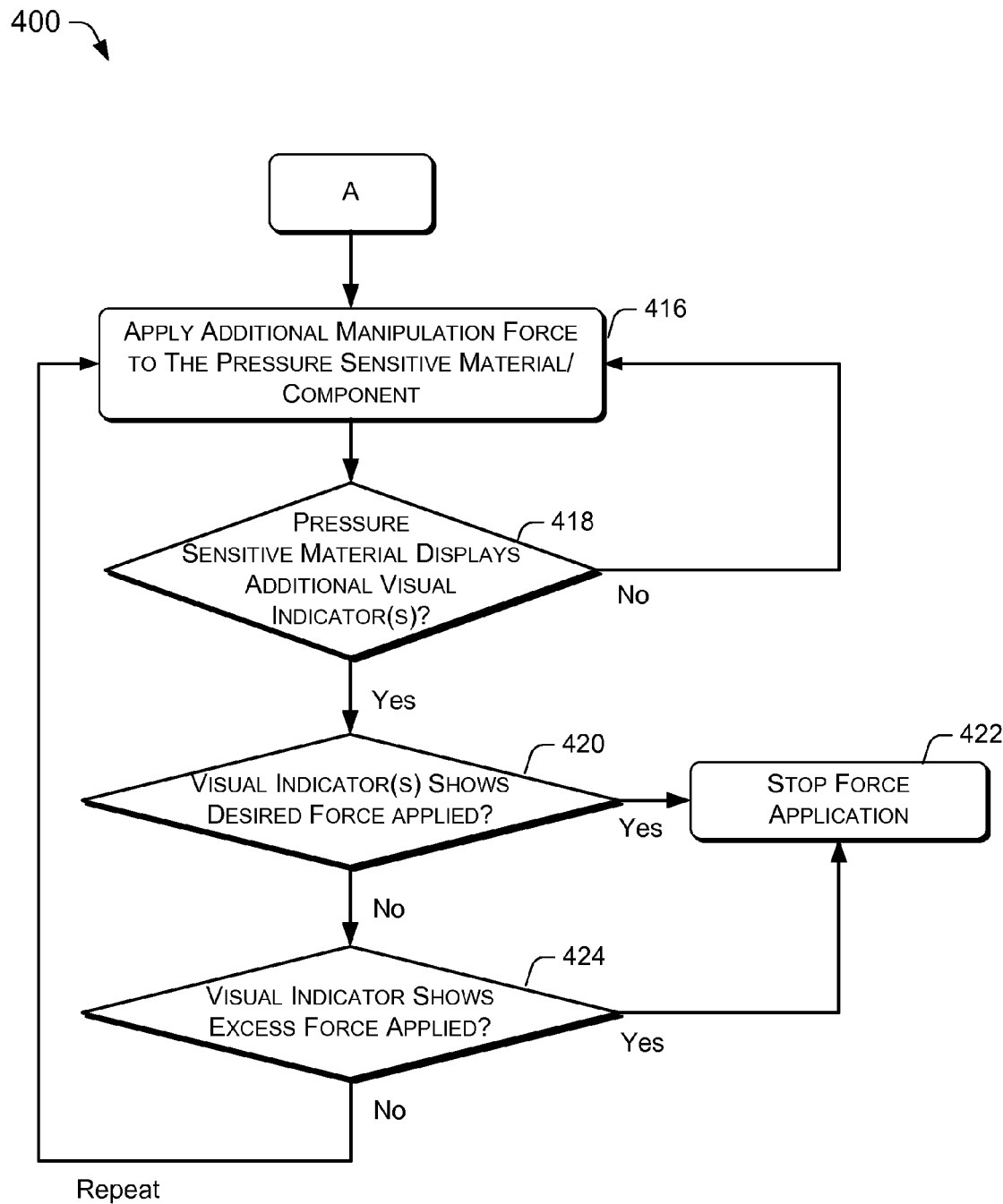

FIG. 4 is a flow diagram illustrating an exemplary process 400 for using pressure sensitive materials in accordance with an embodiment of the invention. The order in which the operations are described is not intended to be construed as a limitation, and any number of the described blocks can be combined in any order and/or in parallel to implement the process.

At block 402, a pressure sensitive material, such as pressure sensitive film 200 and pressure sensitive paint 300, may be selected for application on a component. As described above, the component may be any hardware component that is subject to manipulation by a tool. The pressure sensitive material may be selected so that when the hardware is manipulated by a tool, the pressure sensitive material will at least display a visual indicator at a first manipulation force threshold.

In one embodiment, the pressure sensitive material may be selected so that the first manipulation force threshold corresponds to the minimal force required to continuously manipulate the component. For example, the threshold may be set so that the microcapsules 204 may burst as soon as a tool begins to tighten the component, such as the fastener 104. In another embodiment, the first threshold may be selected to correspond to the force encountered when the component is properly manipulated to a terminal position. For instance, the fastener 104 may be tightened until a certain amount of resistance force is encountered. In one specific example, the resistance force may be such that the application of an opposing force which exceeds the resistance force is capable of causing damage to the fastener 104 and/or components mated to fastener 104. Nevertheless, it will be appreciated that the first threshold may be set at any desired level. Moreover, the selected pressure sensitive material may also display additional visual indicators of different intensity at additional manipulation force thresholds.

Specifically, the pressure sensitive material may display a visual indication at the first manipulation force threshold because one or more of the microcapsules 204 in a pressure sensitive film 200 burst. In other embodiments, the pressure sensitive material may display a visual indicator at the first manipulation force threshold because the threshold may be a point where sufficient oxygen molecules 308 are forced out of the oxygen permeable binder 302 of the pressure sensitive paint 300 so as to cause a desired increase in the emitted radiation level.

At block 404, the pressure sensitive material may be affixed to a component. In one embodiment, the component may be a fastener 104 as described in FIGS. 1a and 1b. At block 406, a manipulation force is applied to the component. The manipulation force may be an impact force, a compression force, a torque force, or any other force that may be imparted on the component. Further, the pressure sensitive material is generally affixed to the component in such a way that the manipulation force is also applied to the pressure sensitive material on the component.

At decision block 408, the pressure sensitive material may display a first visual indicator. In one embodiment, the visual indicator is displayed by the pressure sensitive material when the manipulation force reaches the first manipulation force threshold, hereafter referred to as "first threshold." For instance, in one embodiment where the pressure sensitive material is a pressure sensitive film 200, at least a portion of the microcapsules 204 may burst, causing reaction with the color development layer that 206 and display of the visual indicator, such as a color patch 206, as described in FIG. 1a. In other embodiments, a pressure sensitive paint 300 may increase its emitted radiation 308 output to a level that corresponds to a first threshold. In specific embodiments, a sensor-equipped computer may be configured to store such a threshold and detect a threshold correspondence. Once the correspondence is reached, the sensor-equipped computer, in turn, may present a visual signal on a display device. For instance, the computer may cause an indicator light to glow, or a numerical or graphical representation of the radiation level to be presented on a screen. In some instances, the visual indicator may be accompanied by an audio signal, such as a warning tone or a recorded speech.

If the pressure sensitive material does not display a first visual indicator, ("no" at decision block 408), e.g., no microcapsules 104 were punctured or insufficient oxygen molecules 208 penetrated the oxygen permeable binder 202, the method loops back to block 406, where further manipulation force is applied.

However, if the pressure sensitive material does display a first visual indicator, ("yes" at decision block 408), the process may continue to decision block 410. At decision block 410, an operator applying the manipulation force to the pressure sensitive material may determine whether the visual indicator represents that the desired force was applied. For example, in the case of a pressure sensitive film 200, the operator may ascertain the pressure applied by comparing the intensity of the color patch 106 with a pre-established correspondence chart. In the instance of a pressure sensitive paint 300, an operator may visually gauge the increase in emitted radiation 308, and make a judgment as to whether the increase indicates desired force was applied. Alternatively, a first threshold stored on the sensor-equipped computer may represent the levels of desired or applied force. Accordingly, the fact the visual indicator, that is, the increase in emitted radiation, reached the threshold may trigger a signal, a numerical representation, or a graphical presentation that represents the application of desired force.

If the operator determines that the visual indicator shows that the desired force was applied, ("yes" at decision block 410), the operator may stop the application of force to the component at block 412. For example, the operator may cease applying torque pressure to the exemplary fastener 104.

However, if the operator determines that the visual indication shows that that the desired force has not been applied, ("no" at decision block 410), the process may continue to decision block 414.

At decision block 414, the operator may determine whether the visual indicator shows that excess force was applied. The operator may make this determination in the same manner as described in block 410. If the operator determines that the visual indicator shows that an excess force was applied, ("yes" at decision block 414), the operator may stop the application of force to the component at block 412. For example, the operator may cease applying torque pressure to the exemplary fastener 104, and may take other corrective action as may be needed, including loosening or replacing the fastener 104.

However, if the operator determines that the visual indication shows that excess force has not been applied, ("no" at decision block 414), the process may continue to block 416.

At block 416, an additional manipulation force may be applied to the component. Subsequently, at decision block 418, the pressure sensitive material may display an additional visual indicator. Specifically, the additional visual indicator may be displayed to show that an additional manipulation force threshold (hereafter "additional threshold") is reached. In one embodiment, the additional threshold may be selected to correspond to a force required to continuously manipulate the component. In another embodiment the additional threshold may correspond to an amount of force sufficient to tighten, but not over-tighten, a fastener 104. In additional embodiments, the additional threshold may also correspond to an excessive magnitude of force. For instance, in case of a fastener 104, the additional threshold may be established to facilitate the indication that excessive manipulation force, or force which may cause damage to the fastener 104 was applied. Nevertheless, it will be appreciated that in other embodiments, the additional threshold referenced at decision block 418 may correspond to any force magnitude as long as it is higher than the first threshold referenced at block 402. Furthermore, in some embodiments, the pressure sensitive material display additional visual indicators, e.g., increased levels of color intensity, which correspond to additional thresholds, where each additional threshold is higher than the previous additional threshold.

As described above, microcapsules 204 that are capable of bursting at a higher pressure may be used to show the attainment of the additional threshold in embodiments that employ pressure sensitive film 200. In embodiments that include pressure sensitive paint 300, higher level of emitted radiation may serve as one or more additional visual indicators that correspond to additional manipulation force thresholds.

If the pressure sensitive material did not display an additional visual indicator, ("no" at decision block 418), then the process may loop back to block 416, where additional manipulation force may be applied to component. This in turn applies additional force on the pressure sensitive material. However, if the pressure sensitive material does display an additional visual indicator, ("yes" at decision block 418), the process may continue to decision block 420.

At decision block 420, the operator applying the manipulation force to the pressure sensitive material may determine whether the additional visual indicator represents that the desired force was applied. The operator may make this determination using the procedure described with respect to block 410. If the operator determines that the additional visual indicator shows that the desired force was applied, ("yes" at decision block 420), the operator may stop the application of force to the component at block 422. For example, the operator may cease applying torque pressure to the exemplary fastener 104. Additionally, the operator may take corrective measures as described above.

However, if the operator determines that the visual indication shows that the desired force has not been applied, ("no" at decision block 420), the process may continue to decision block 424. At decision block 424, an operator applying the manipulation force to the pressure sensitive material may determine whether the visual indicator shows that excess force was applied. Once again, the operator may make this determination in the same manner as described in block 410. If the operator determines that the visual indicator shows that an excess force was applied, ("yes" at decision block 424), the operator may stop the application of force to the component at block 422. For example, the operator may cease applying torque pressure to the exemplary fastener 104.

Nevertheless, if the operator determines that the visual indication shows that excess force has not been applied, ("no" at decision block 424), the process 400 may loop back to block 416, where additional manipulation force may be applied to the component and in turn, the pressure sensitive material.

Embodiments of systems and methods in accordance with the present disclosure may provide significant advantages over the prior art. For example, by providing visual indicators, these embodiments may advantageously reduce or eliminate incidents of failure to tighten or improper tightening (under-tightening or over-tightening) of components. Installation efficiency may also be increased. Additionally, the proper installation, i.e., tightening of components, may prevent or mitigate downtime, as well as reduce costs associated with mechanical failures and troubleshooting of such failures. Proper installation may also increase the safety and comfort of persons utilizing the hardware, e.g., vehicles, machinery, appliances, which include the components.

Figure 5:
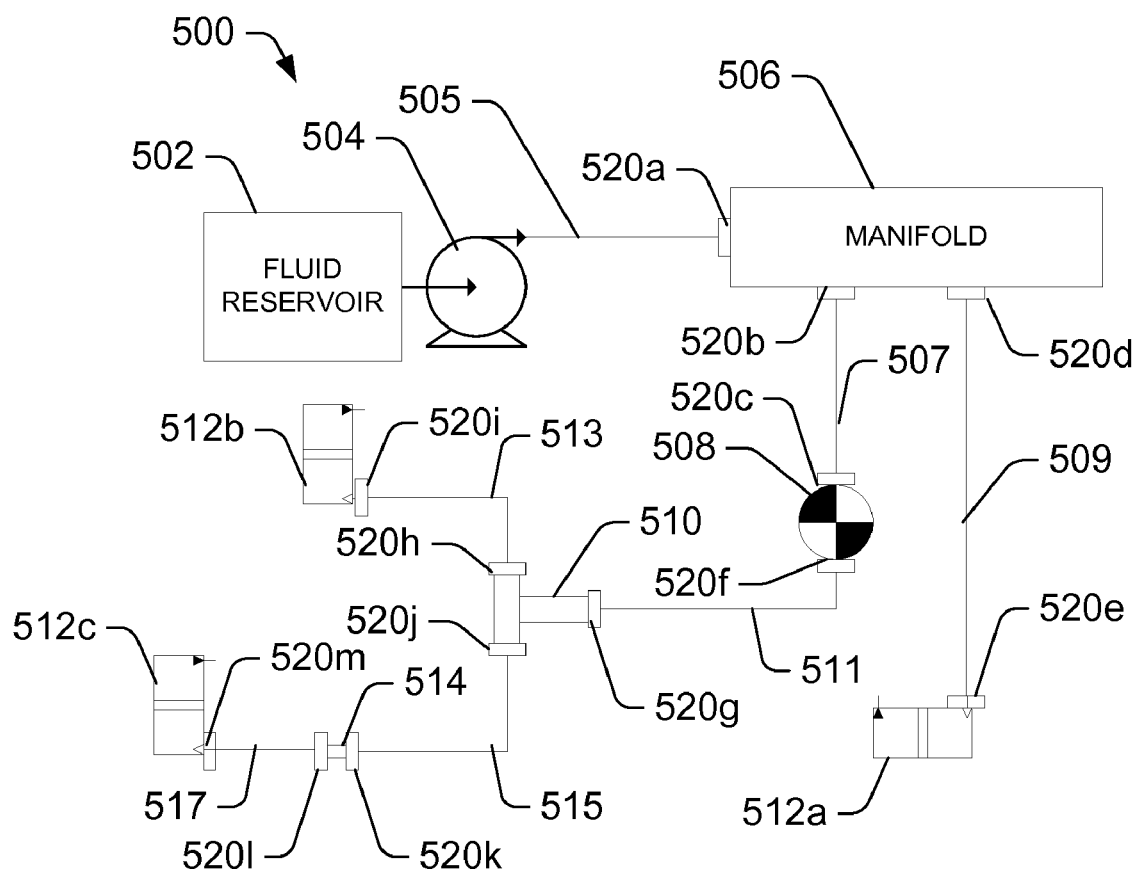
FIG. 5 is a schematic view of a system in accordance with another embodiment.

It will be appreciated that the teachings of the present disclosure may be applied to a wide variety of systems and components that require tightening and for which an indication of the applied pressure (visual or machine detectable) may be desired. For example, FIG. 5 is a schematic view of an exemplary hydraulic system 500 in accordance with an embodiment of the invention. In this embodiment, the system 500 includes a fluid reservoir (or source) 502 coupled to a pump 504 that provides a pressurized fluid via a first line 505 to a manifold 506. A second line 507 extends from the manifold 506 to a valve 508. A third line 509 extends from the manifold 506 to a first actuator 512a, while a fourth line 511 extends from the valve to a tee 510. A fifth line 513 extends from the tee 510 to a second actuator 512b. A sixth line 515 extends from the tee 510 to a union 514, and a seventh line 517 extends from the union 514 to a third actuator 512c.

As further shown in FIG. 5, the system 500 includes a plurality of fluidic fittings (or coupling members) 520 distributed throughout and coupling the various components of the system 500. More specifically, a first fitting 520a couples the first line 505 to the manifold 506. A second fitting 520b couples the second line 507 to the manifold 506, and a third fitting 520c couples the second line 507 to the valve 508. Fourth and fifth fluidic fittings 520d, 520e couple the third line 509 to the manifold 506 and the first actuator 512a, respectively. Sixth and seventh fluidic fittings 520f, 520g couple the fourth line 511 to the valve 508 and the tee 510, respectively. Eighth and ninth fluidic fittings 520h, 520i couple the fifth line 513 to the tee 510 and the second actuator 512b. Tenth and eleventh fluidic fittings 520j, 520k couple the sixth line 515 to the tee 510 and the union 514, and finally, twelfth and thirteenth fluidic fittings 520l, 520m couple the seventh line 517 to the union 514 and the third actuator 512c, respectively.

The fluidic fittings 520 may include a pressure sensitive material that provides a visual or machine-detectable indication of an amount of applied force (or pressure or torque) as described above, in accordance with various embodiments of the present invention. The fluidic fittings 520 may be any suitable types of fittings, coupling devices, or components upon which a tool (not shown) may be used to apply a force or pressure, including threaded members, swage fittings, crimpable members, or any other suitable type of fitting or coupling. Further, the fluidic fittings 520 may be separate components, or may be part of the components with which they are associated. For example, the first fitting 520a may be a separate component, or may be part of the first line 505 or the manifold 506. Similarly, the third fitting 520c may be part of the second line 507 or the valve 508 (or may be a separate component). In this way, a wide variety of embodiments of fluidic fittings 520 may be conceived that incorporate the teachings (and provide the advantages) of the present disclosure.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A method for indicating applied pressure, comprising:
    affixing a pressure sensitive material to a coupling component, wherein the pressure sensitive material is configured to display a color of a first intensity that corresponds to a first threshold of a manipulation force, and display the color of a second intensity that corresponds to a second threshold of the manipulation force;
    applying the manipulation force to the coupling component;
    identifying the manipulation force as reaching the first threshold when the first intensity is displayed by the pressure sensitive material; and
    identifying the manipulation force as reaching the second threshold when the second intensity is displayed by the pressure sensitive material.

2. The method of claim 1, further comprising stopping the manipulation force application when the first intensity or the second intensity is displayed by the pressure sensitive material.

3. The method of claim 1, wherein affixing the pressure sensitive material to the coupling component includes affixing the pressure sensitive material to a fluidic fitting, and applying the manipulation force includes applying the manipulation force to the fluidic fitting.

4. The method of claim 1, wherein the second intensity is greater than the first intensity, and wherein the second threshold of the manipulation force is greater in magnitude than the first threshold of the manipulation force.

5. The method of claim 1, wherein affixing the pressure sensitive material includes affixing a pressure sensitive material that includes first microcapsules that burst at the first threshold of the manipulation force to provide the color of the first intensity, and second microcapsules that burst at the second threshold of the manipulation force to provide the color of the second intensity.

6. The method of claim 1, wherein the coupling component is configured to receive a maximum manipulation force, and wherein the first threshold corresponds to a maximum manipulation force for tightening the coupling component to a terminal position, and the second threshold exceeds the maximum manipulation force for tightening the coupling component to the terminal position.

7. The method of claim 1, wherein applying the manipulation force includes applying torque pressure to the coupling component.

8. The method of claim 7, wherein the coupling component is configured to receive a maximum torque pressure, and wherein the first threshold corresponds to the maximum torque pressure for tightening the coupling component to a terminal position, and the second threshold exceeds the maximum torque pressure for tightening the coupling component to the terminal position.

9. The method of claim 1, wherein affixing the pressure sensitive material to the coupling component includes affixing a pressure sensitive material to a fastener, and wherein applying the manipulation force includes applying the manipulation force to the fastener.

10. The method of claim 1, further comprising selecting a pressure sensitive material configured to at least display the second intensity when the manipulation force is substantially equal to a force desired for proper installation of the component.

11. The method of claim 1, wherein the pressure sensitive material includes one of an oxygen-sensitive material and a microcapsule-embedded material.

12. A method for indicating applied pressure for a coupling component, comprising:
    selecting a pressure sensitive paint for the coupling component, wherein the pressure sensitive paint is configured to display a first luminescence level when the component receives a first torque pressure, and display a second luminescence level when the coupling component receives a second torque pressure;
    applying the pressure sensitive paint to the coupling component;
    applying a torque pressure to the coupling component; and
    identifying the applied torque pressure as reaching the first torque pressure when the first luminescence level is displayed by the pressure sensitive paint;
    identifying the applied torque pressure as reaching the second torque pressure when the second luminescence level is displayed by the pressure sensitive paint,
    wherein the second luminescence level is greater than the first luminescence level.

13. The method of claim 12, wherein the coupling component is a fluidic fitting component.

14. The method of claim 12, wherein the first torque pressure corresponds to a desired torque pressure, and the second torque pressure corresponds to an excessive torque pressure.

15. The method of claim 14, further comprising terminating the torque pressure when the first luminescence level or the second luminescence level is displayed.

16. The method of claim 12, wherein selecting a pressure sensitive paint includes selecting a pressure sensitive paint that includes oxygen-sensitive luminescent dye particles.

17. A system, comprising:
    a coupling component configured to fluidly couple a first coupling component to a second coupling component; and
    a pressure sensitive paint applied to an outer surface of the coupling component and configured to display a first luminescence level when a first threshold of the manipulation force is applied to the component, and display a second luminescence level when a second threshold of the manipulation force is applied to the component, and wherein the second threshold of the manipulation force is greater in magnitude than the first threshold of the manipulation force, wherein the first and second luminescence levels are produced by oxygen-sensitive luminescent dye particles.

18. The system of claim 17, wherein the first threshold or the second threshold of the manipulation force is substantially equal to a force desired for proper installation of the coupling component.

19. The system of claim 17, further comprising a sensor-equipped computer to detect the at least one luminescence level.

20. The system of claim 17, wherein the second threshold of the manipulation force exceeds a force desired for proper installation of the coupling component.

* * * * *

UNITED STATES PATENT AND TRADEMARK OFFICE
CERTIFICATE OF CORRECTION

PATENT NO.        : 7,649,469 B2
APPLICATION NO.   : 11/755615
DATED             : January 19, 2010
INVENTOR(S)       : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 333 days.

Signed and Sealed this

Twenty-third Day of November, 2010

David J. Kappos
*Director of the United States Patent and Trademark Office*